(12) United States Patent
Liao

(10) Patent No.: US 6,439,443 B1
(45) Date of Patent: Aug. 27, 2002

(54) ARTICLES HANGER FOR AUTOMOBILE TRANSPORTATION

(76) Inventor: Michael Liao, 9569 Broadway Unit 7, Temple City, CA (US) 91780

( * ) Notice: Subject to any disclaimer, the term of this patent is extended or adjusted under 35 U.S.C. 154(b) by 0 days.

(21) Appl. No.: 09/677,358

(22) Filed: Oct. 2, 2000

(51) Int. Cl.⁷ ............................................... B60R 7/04
(52) U.S. Cl. .............................. 224/275; 297/188.06
(58) Field of Search ................. 224/275; 297/188.04, 297/188.05, 188.06

(56) References Cited

U.S. PATENT DOCUMENTS

| | | | | |
|---|---|---|---|---|
| 2,680,523 A | * | 6/1954 | Heeter | 224/275 |
| 2,869,146 A | * | 1/1959 | Allison | 224/275 |
| 2,932,544 A | * | 4/1960 | Lambert | 224/275 |
| 3,986,649 A | * | 10/1976 | Heimstra | 224/275 |
| 4,757,928 A | * | 7/1988 | Browne | 224/275 |
| 5,058,790 A | * | 10/1991 | LaVelle | 224/275 |
| 5,383,588 A | * | 1/1995 | Kazel | 224/275 |
| 5,678,741 A | * | 10/1997 | Schieber | 224/275 |
| 5,791,614 A | * | 8/1998 | Sims | 224/275 |
| 6,105,839 A | * | 8/2000 | Bell | 224/275 |

FOREIGN PATENT DOCUMENTS

| | | | | |
|---|---|---|---|---|
| GB | 2238993 A | * | 6/1991 | 224/275 |
| GB | 2239639 A | * | 7/1991 | 224/275 |
| WO | WO-93/25411 | * | 12/1993 | 224/275 |

* cited by examiner

Primary Examiner—Stephen P. Garbe

(57) ABSTRACT

The car butler is an articles hanger for use in a car. The device is presented as a main member that attaches to headrest poles in a car seat at a second end and attaches to a clipping or hooking means at the first end. A supporting member attaches to the first end and supports the main member. The supporting member has a foot to contact the car seat. The apparatus can be folded into a flat arrangement for storage. The clip or hook holds a bag of take out or fast food so that the food does not slosh or spill when the driver makes turns or sudden stops.

8 Claims, 4 Drawing Sheets

ARTICLES HANGER FOR AUTOMOBILE TRANSPORTATION

REFERENCES CITED

| Webster | 5,868,294 | 2/9/1999 |
|---|---|---|
| Carpentier | 4,466,659 | 8/21/1984 |
| Hurst | 5,762,245 | 6/9/1998 |

BACKGROUND

Most people in the United States travel by car and transport things by car. Drivers often pick up groceries or fast food and put them in the front passenger seat. Even in a gentle turn, items on the front seat often slide out of place and fall on the floor. The driver's seat is not well suited to hold items being transported. Even if secured, some items such as bowls of soup can still be difficult to transport on a car seat.

Thai food has become popular in the United States. Thai food often comprises noodles smothered with delicious hot sauce along with meats such as chicken and beef. A meal may also include a soup. Thai food is a favorite take out item among college age students. The meal is usually packaged in a three section Styrofoam container having one indentation for the main dish section and two smaller indentations for the side dish sections. The container is usually not watertight. Tipping the container will cause the noodles to slosh and spill out. The soup is usually packaged in a Styrofoam container with a semi-translucent plastic lid. The semi-translucent plastic lid often has a small hole in the middle to equalize air pressure so that the lip of the lid can maintain a watertight seal with the edge of the container. Nonetheless, the soup may also spill if it were tipped over.

The roughly rectangular food container is usually placed in a thin plastic bag with the soup container resting upon the food container. Keeping such food in the front seat of a car creates a substantial risk that the contents would spill. Sudden stops, sudden acceleration, and sharp turns create a opportunities to spill one's dinner.

Automobiles are often not filled to capacity. Often, one, two or three seats are empty and available for holding items. The empty seats allow supporting devices such as trays and hangers to be attached to the empty seats and take advantage of the available space.

Several patents describe various methods of attaching containers to car seats. Webster, U.S. Pat. No. 5,868,294 Feb. 9, 1999, presents a "Vehicle Utility Receptacle", which is a container suspended between two car seats. The container hangs between the front two car seats and can attach to the headrests of the two front car seats. Webster, U.S. Pat. No. 5,868,294 describes hooks attaching to the headrest. A receptacle has the advantage of being able to hold a large volume of articles. Unfortunately, a receptacle would not prevent food from sloshing around inside the food container.

Carpentier U.S. Pat. No. 4,466,659 discloses a seat back mounted tray holder that holds items and creates a small dining area. The articles adhere to the tray shelf and allow a passenger to have a table while eating or reading. Hurst U.S. Pat. No. 5,762,245 discloses a tray adapted for use on the inside of a trunk lid.

Often times, a driver needs to hold take out food. While driving around town, applicant Michael Liao conceived of a new device that the calls the Car Butler. The Car Butler can hold items while the car starts, stops and turns.

DETAILED DESCRIPTION OF THE PREFERRED EMBODIMENT

Figure 1:
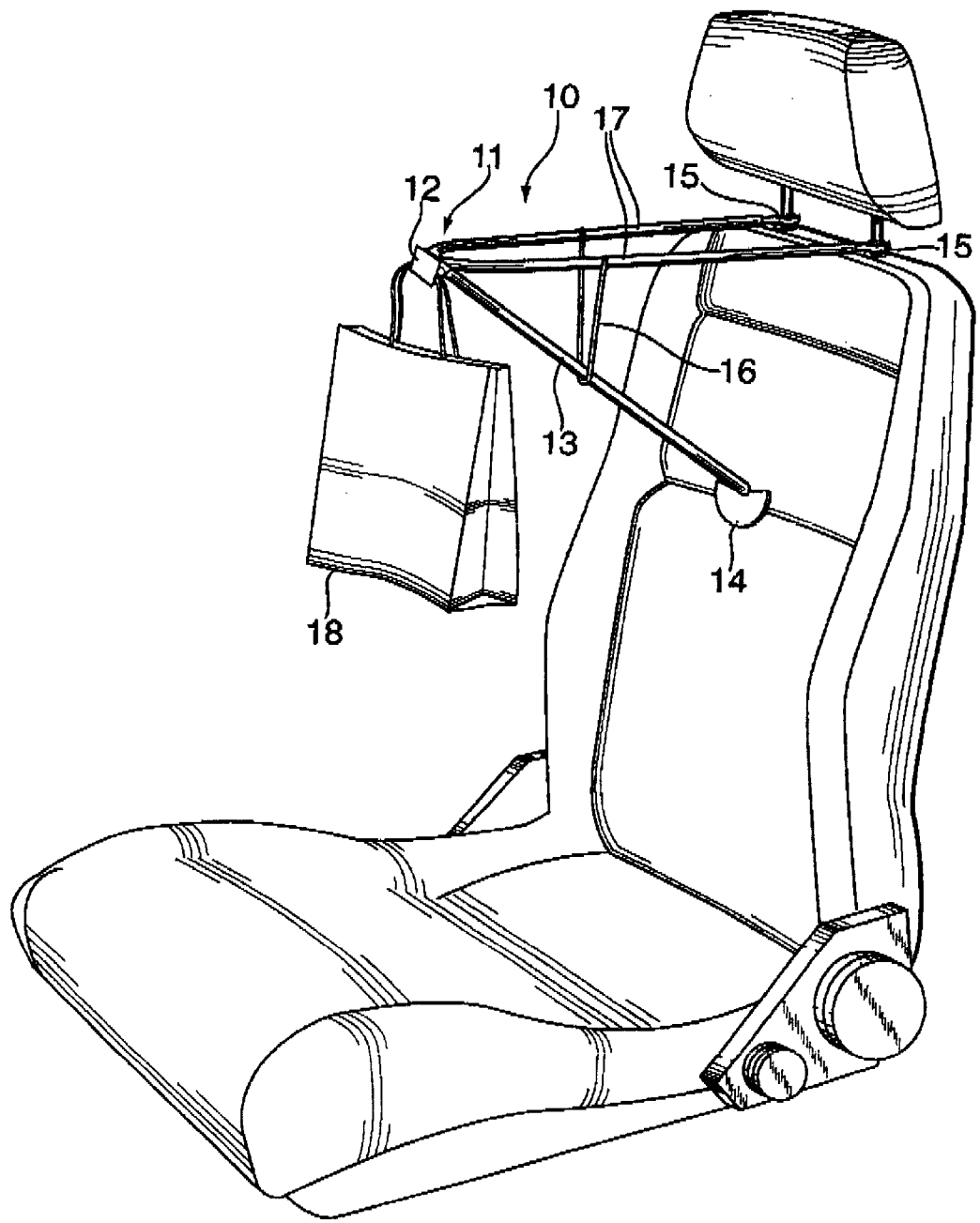
FIG. 1 is a diagram of the car butler articles hanger in deployed position.

Applicant claims domestic priority under provisional application Liao, Michael 60226744 Articles Hanger for Automobile Transportation having Express Mail EK 744946162US and a filing date of Aug. 22, 2000. The preferred embodiment is described as follows. FIG. 1 The main rod 17 is a rigid member bent in a V shape. The main rod 17 can also be one flat plastic member without a V shape, but it is believed that the V shape is superior. The main rod 17 remains relatively horizontal in reference to the car floor. The terminating ends 19 of the main rod have two headrest hook means 15 such as hooks, eyelets, clips or any other common method capable of attaching the terminating ends to the car headrest poles. Most cars have car headrest poles as shown in FIG. 1. Usually, two rods attach to a car seat and hold the headrest. The two rods allow a user to adjust the headrest up and down. One rod is usually smooth, and the other has grooves placed at regular intervals, which allow headrest height adjustment.

When the main rod 17 is implemented in a V shape, the rod can bend to fit different dimensions of headrest poles. Some headrest poles will be closer together and some will be further apart. The headrest poles that are closer together can receive a car butler articles hanger when the user pushes the terminating ends of the main shaped V rod 17 together.

Figure 3A:
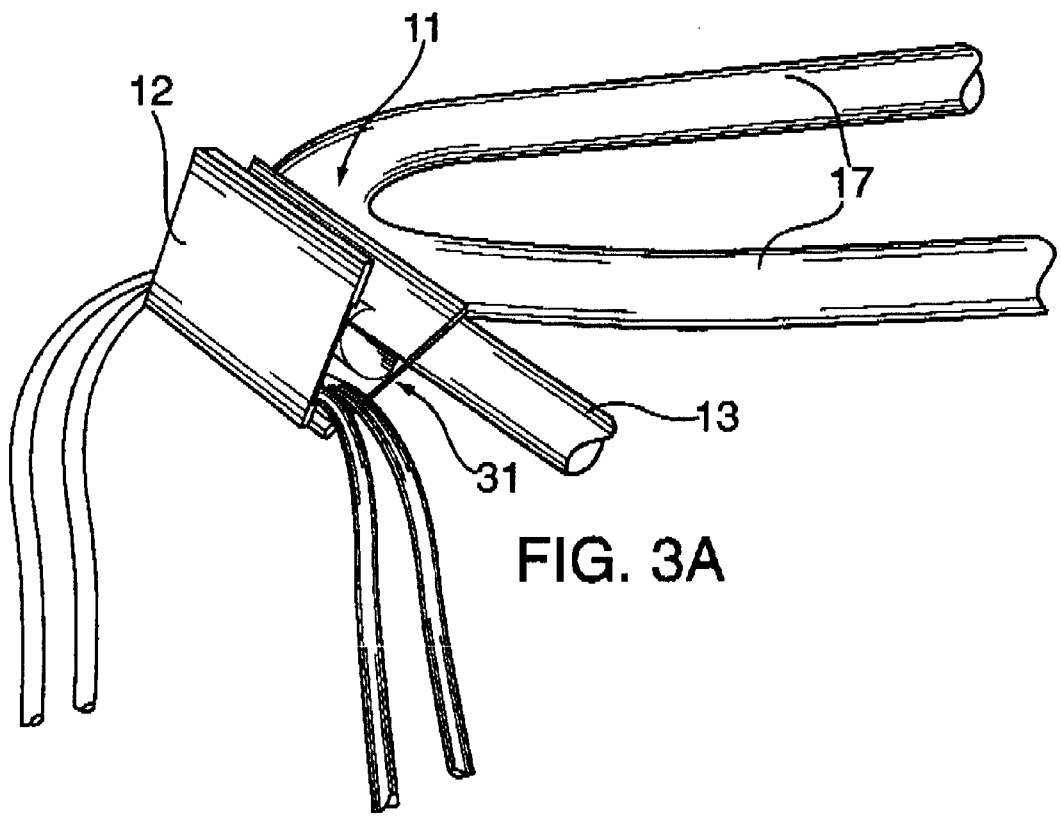
FIG. 3A is a diagram of the hook and clip portion of the car butler articles hanger in deployed position.
Figure 3B:
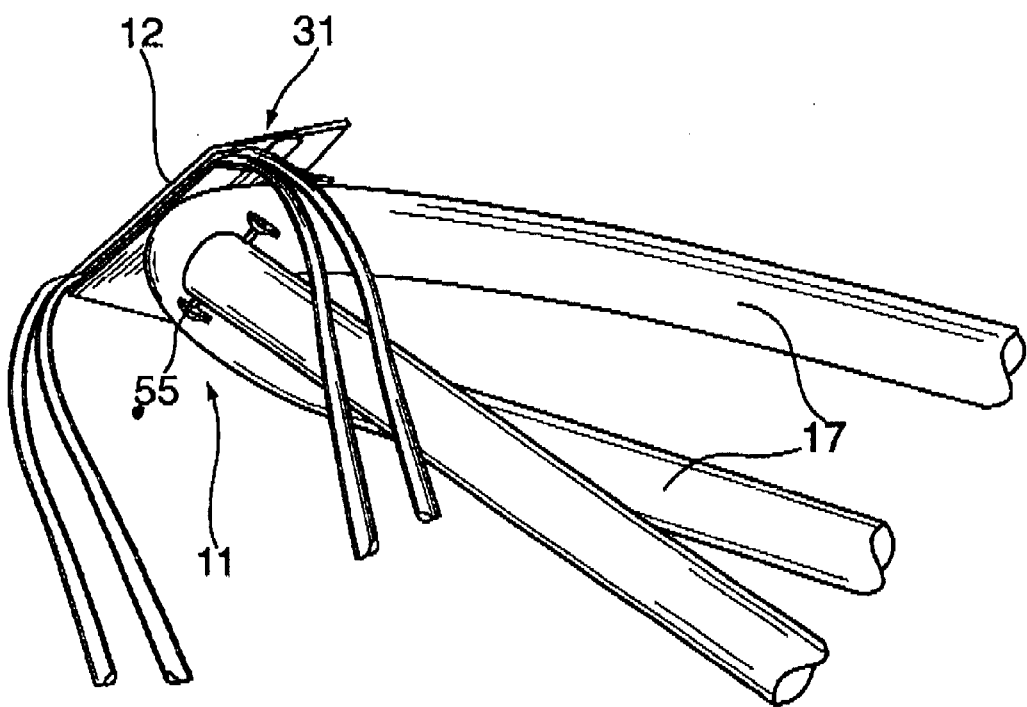
FIG. 3B is an underside view of the hook and clip portion of the car butler articles hanger in deployed position.

The vertex 11 of the main rod contains a clip 12 and a hook 12. FIG. 3 The preferred means to hook is to have a clip 12 that also acts as a hook 12. Most clips 12 have a leaf spring and a notch 31 between the opposing sides of the clipping members. The opposing sides of the clipping members can be described as two legs, FIG. 3, a first leg 111 and a second leg 222. A plastic bag can be hooked onto this notch 31 or onto the entire clip. The clip and hook 12 allow one to attach a bag to the hanger. The first end of the main rod is the vertex 11 and the second end of the main rod is connects to two hooks or clips 15 or any other similar means to attach to the headrest poles.

Figure 2:
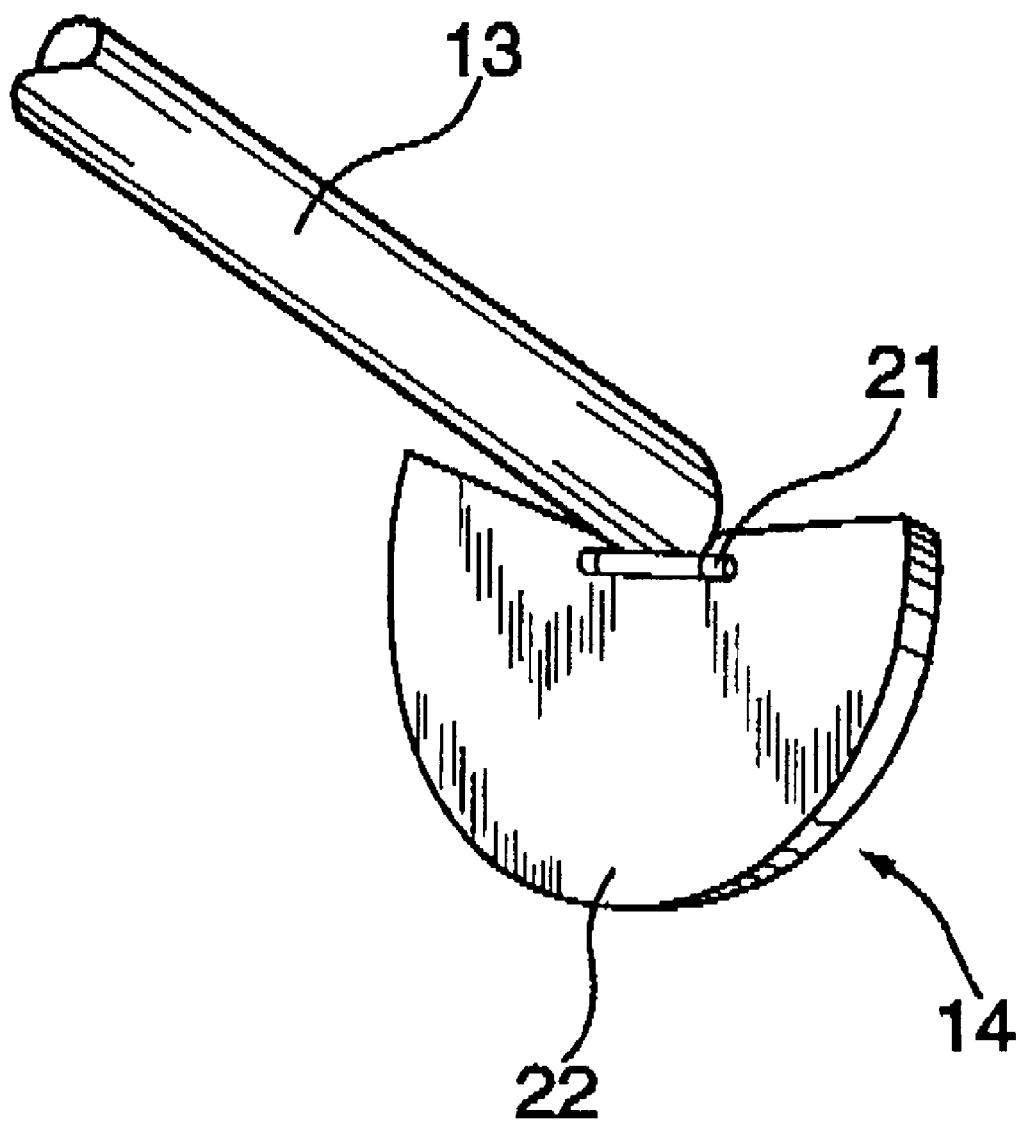
FIG. 2 is a diagram of the foot portion of the car butler articles hanger in deployed position showing a supporting member with a relatively flat rectangular cross section.

The supporting rod 13, connects to the main rod 17 at the vertex of the V bend 11. FIG. 2 The other end of the supporting rod 13 has a small foot 14 that rests against the seat to support the device. The supporting rod may be telescoping and adjustable in length. The small foot is preferably a semi circular or circular plate 22 and able to swivel along a pin joint 21 so that it will stay vertically aligned to automatically align it with the seat back. Thus, the circular foot 14 is preferably a plate 22 and weighted so that it swivels into position. The circular foot can be made of rubber to better adhere to the car seat. When a user deploys the car butler articles hanger, by unfolding it, the foot end 14 should automatically swivel into position, which makes installation more user friendly.

FIG. 1 The vertical angle of the supporting rod 13 and main rod 17 is fixed by cord 16 attached to the midpoints of the rods. The cord does not need to be elastic. The prototype was made of bendable metal rods. Actual production could be wood, plastic or some other rigid material.

Use and Operation

Figure 4:
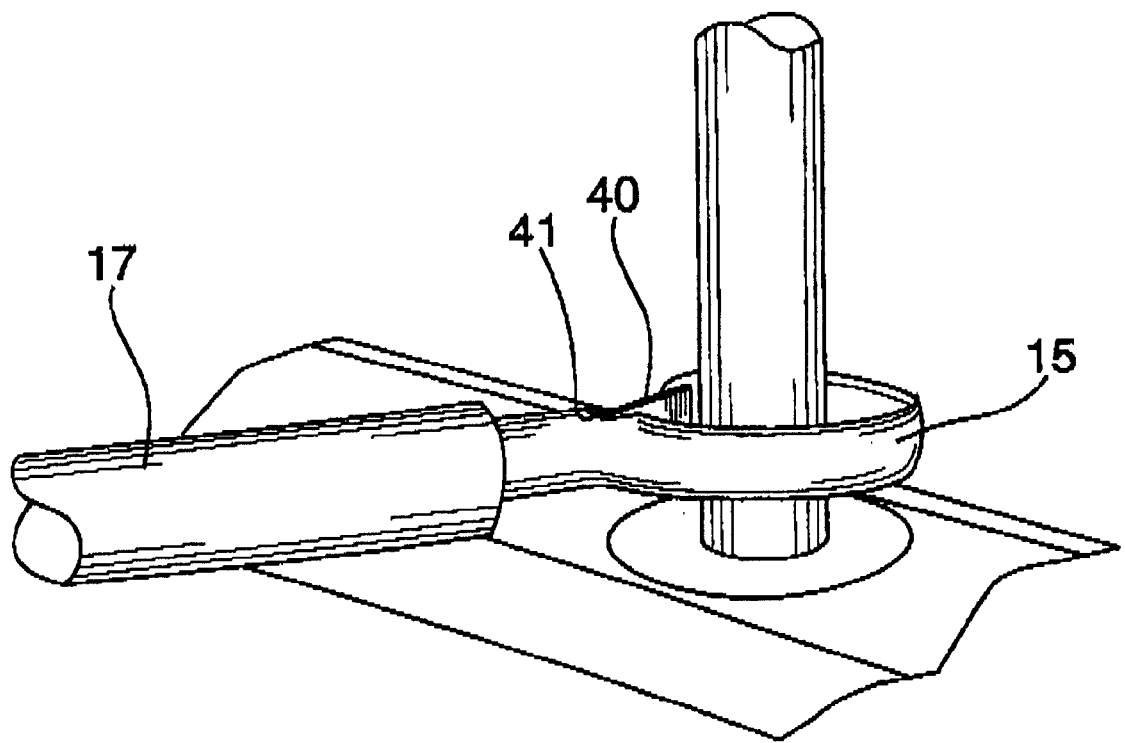
FIG. 4 is a diagram of the preferred embodiment of the hook means attaching to a headrest pole.

FIG. 1 A user of the Articles Hanger unfolds the main rod 17 and supporting rod 13. The hooks or eyelets 15 on the main rod connect to the headrest poles. FIG. 4 shows that a hook 15 with a retaining leaf spring 40 can hold the headrest hook. The retaining leaf spring can be installed by inserting a leaf spring into a slot 41 in the headrest hook 15. FIG. 1 The supporting rod 13 hangs from the cords 16 and rests against the seat to support the device 10. The user takes articles, puts them into a bag 18 and hangs them from the hook or clip 12 located at the vertex 11 of the main rod 17.

If the articles hung were food, a sudden stop would not create sloshing of the food inside the food container. Take out food ('take away' in the UK) is usually put in a plastic bag provided by the food establishment. The plastic bag when hung from the articles hanger will swing in case of a sudden stop of the car. The articles hanger would be subjected to the same tangential forces as the car, but the food would only experience force upwards as if the gravitation of the Earth were slightly increased.

Some food is susceptible to sloshing, but not spilling. If the user were to buy a cherry pie and place it in a bag it would also not slosh. When the car accelerates, decelerates, and turns, the articles react to the force by swinging. Not only does the bag stay in a relatively fixed position, the articles inside the bag are not subjected to substantial tangential forces. This would prevent a cherry pie from sloshing within its tin.

When the user arrives at her destination she unhooks the plastic bag 18 to remove the food from the car. The articles hanger 10 can be unhooked from the headrest poles. The device has a pin joint 55 at vertex 11 to allow to device to fold together. The device folds together into a planar space with the main rod essentially parallel to the supporting rod. In the V shape main rod configuration, the supporting rod fits between the V members of the main rod so that the articles hanger is flat. The hanger, now flat, can be put into a seat pocket behind the passenger seat.

What is claimed is:

1. A car butler apparatus, comprising:
   a. a main rod having headrest hooks at a first end and an articles hook at a second end, said headrest hooks being shaped to attach to headrest poles in a car, said articles hook being shaped to hold articles such as a hanging bag,
   b. a supporting member supporting said main rod at the first end, said supporting member having a foot and resting against the car seat, whereby the device is supported, said supporting member attached to said main rod by a pin joint to allow folding of the car butler apparatus into an essentially flat configuration.

2. The car butler apparatus of claim 1, further comprising an angle limiting cord attached from about the midpoint of the main rod to the midpoint of the supporting member, whereby the angle of the main rod and the midpoint of the supporting member are fixed when a user deploys the car butler apparatus.

3. The car butler apparatus of claim 2, wherein said main rod is formed in a V shape by bending a straight rod creating a vertex at said first end, wherein said articles hook attaches to said vertex at said first end, wherein two headrest hooks attach to said second end, wherein said supporting member attaches to said main rod at said vertex.

4. The car butler apparatus of claim 3, wherein said foot end comprises a flat circular plate attached to said supporting member with a pin joint, wherein said flat circular plate is weighted so that it swivels by force of gravity to align said flat circular plate in a vertical orientation, whereby said flat circular plate swivels to be essentially parallel to the seat surface.

5. The car butler apparatus of claim 1, wherein said main rod is formed in a V shape by bending a straight rod creating a vertex at said first end, wherein said articles book attaches to said vertex at said first end, wherein two headrest hook means attach to said second end, wherein said supporting member attaches to said main rod at said vertex.

6. The car butler apparatus of claim 5, wherein said foot end comprises a flat circular plate attached to said supporting member with a pin joint, wherein said flat circular plate is weighted so that it swivels by force of gravity to align said flat circular plate in a vertical orientation, whereby said flat circular plate swivels to be essentially parallel to the seat surface.

7. The car butler apparatus of claim 1, wherein said foot end comprises a flat circular plate attached to said supporting member with a pin joint, wherein said flat circular plate is weighted so that it swivels by force of gravity to align said flat circular plate in a vertical orientation, whereby said flat circular plate swivels to be essentially parallel to the seat surface.

8. The car butler apparatus of claim 7, further comprising an angle limiting cord attached from about the midpoint of the main rod to the midpoint of the supporting member, whereby the angle of the main rod and the supporting member are fixed when a user deploys the car butler apparatus.

* * * * *